Nov. 7, 1967 — P. E. KITCH — 3,351,215
SHEET ARTICLE STACKER
Filed Oct. 14, 1964 — 4 Sheets-Sheet 1

INVENTOR.
PAUL E. KITCH
BY
Meyers & Peterson
ATTORNEYS

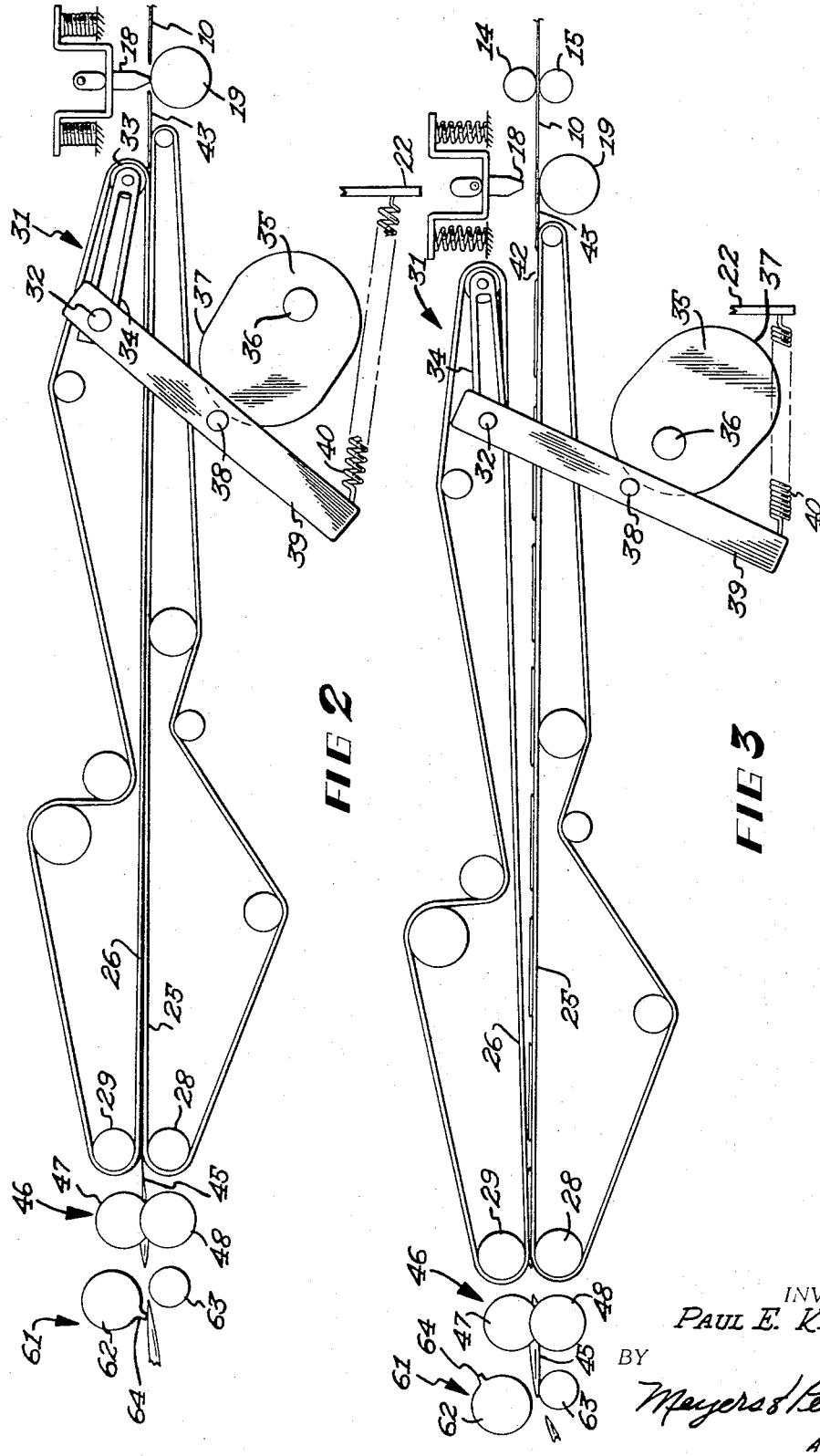

INVENTOR.
PAUL E. KITCH
BY Meyers & Peterson
ATTORNEYS

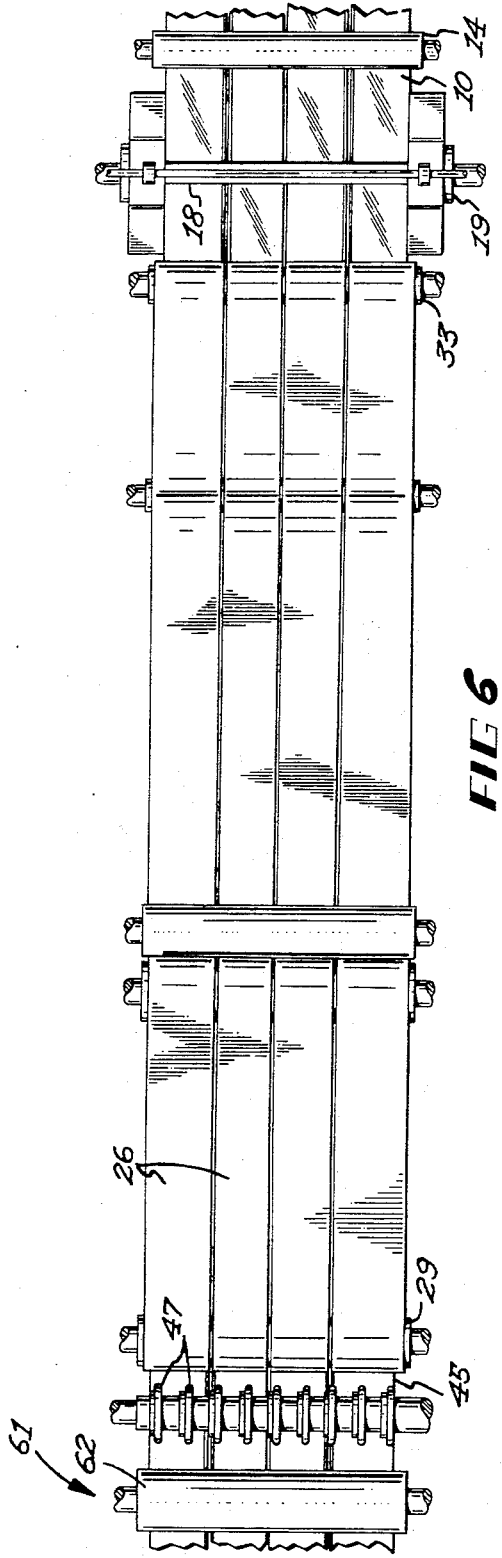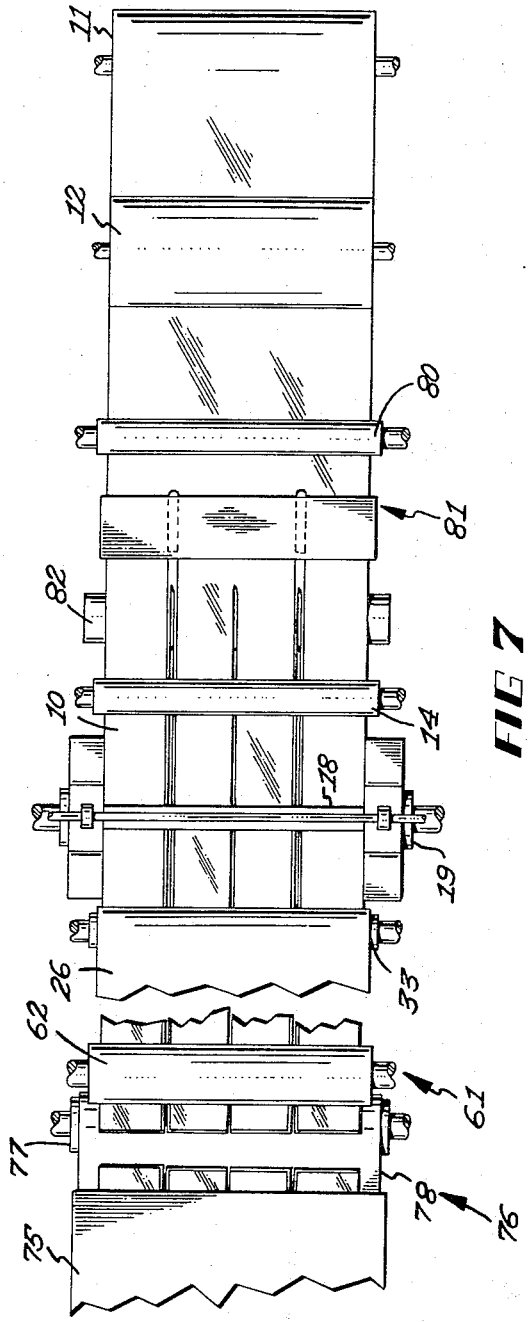

3,351,215
SHEET ARTICLE STACKER
Paul E. Kitch, Northfield, Minn., assignor to G. T. Schjeldahl Company, Northfield, Minn., a corporation of Minnesota
Filed Oct. 14, 1964, Ser. No. 403,790
4 Claims. (Cl. 214—6)

ABSTRACT OF THE DISCLOSURE

A sheet article stacker particularly adapted to assist in the stacking of individual flexible sheet articles such as bags in superimposed relationship, the forward motion of the individual sheet articles being retarded or stopped in a short space, while maintaining the sheets in a flat, non-buckled condition. The apparatus includes a blade means which enters the path of the article and grips the trailing edge thereof as it moves along its predetermined path.

---

The present invention relates generally to an improved apparatus for handling sheet articles or devices, such as bags, and more particularly to an apparatus for controllably attenuating or retarding the rate of speed at which these articles move after they leave the terminal end of a constant speed conveyor and prepare for delivery to or against a stacking gate.

In the fabrication of sheet articles, such as bags or the like, these articles are normally fabricated on a continuous line wherein the operations are carried out at one or more working stations, and after preparation, the individual articles are transferred to a constant speed conveyor and ultimately to a stacking area, such as a stacking gate, stacking station, stacking conveyor or the like which is normally included in a sheet article stacker system, bag stacker system, or the like where the sheet articles or bags may be stacked in superimposed relationship in specific numbers. Because of the excellent surface-to-surface seals which may be prepared utilizing thermoplastic surface sheet film such as polyethylene, polypropylene, or the like, these films have found wide application in the preparation of sheet articles. Sheet articles, such as bags or the like, fabricated from a film of plastic material such as polyethylene, have found general acceptance and wide application in the packaging field, as well as in other applications. In fabricating sheet articles from films of thermoplastic materials, the rate of production is normally limited by the rate of speed at which the material can be conveniently removed from the working stations, this speed previously having been about 100 feet per minute. This is due to the fact that the finished sheet product normally must travel a distance in a downward direction from the end of the conveyor which carries the finished article from the working stations, onto the stacking gate or stacking table. Because these sheet articles normally have a substantial dimension, when moving rapidly, they are subject to catching air currents and thereby lose their longitudinal rigidity and stability when undergoing the drop from the conveyor to the stacking area, such as the stacking gate, stacking table, or stacking conveyor in the ambient atmosphere. While the article is being treated and moved between working stations as a continuous web, or when being moved on a conveyor or the like, ambient air currents are normally not troublesome. However, danger of curling when the article is being transferred from the conveyor onto the stacking area. A further limitation in the fabrication of sheet articles is found in the necessity of spacing these articles as they are being formed. Since the articles are normally fabricated from a continuous band of raw material, after the final fabrication operation, the individual articles are necessarily separated and transmitted individually and independently of one another. This technique is necessary because of the danger that the hot portions of mutually adjacent sheet articles may freeze or re-bond the articles together unless they are individually spaced, one from another. Therefore, the fastest lineal speed operating portion of the equipment is found in the conveyor leading from the final treating station, which conveyor must provide spacing between individual and sequential products, and wherein speeds of up to 200 feet per minute are contemplated in the present invention based upon the capability of the bag making equipment. Various techniques have been employed in order to increase the longitudinal rigidity and stability of sheet articles as they leave a conveyor and start to enter the stacking area. One common method is to pass the article through corrugation wheels or the like where a longitudinally extending transversely corrugated configuration is introduced to the article in order to prepare it for its transfer, as a projectile, into or against the stacker gate in the stacking area. While this technique has met with certain success, it is still desirable to utilize a modified technique to control the stability of these articles as they move from the conveyor to the stacker area. The use of corrugating rolls is furthermore limited since the product, upon leaving, immediately starts to resume its substantially planar configuration, and thus its stability as a projectile is limited by its tendency to revert to this planar configuration. If the longitudinal rigidity and stability gained by the corrugation is lost prior to the time that the free-flight terminates, the flight will obviously be uncontrollable and the stacking area may well be expected to be jammed or clogged by successive disorganized and unoriented sheet articles as they enter the bin or stacking area. The individual articles accordingly become dog-eared or otherwise damaged, and the apparatus must then be shutdown, the area cleared, and the operation then re-commenced. Any shutdown for any given period of time is obviously economically undesirable.

In accordance with the present invention, a speed attenuating means is interposed between the corrugating wheels and the stacking gate to decelerate the sheet articles as they move from the conveyor to the stacking area. The speed attenuating means comprises an apparatus for intermittently entering the path of movement of the sheet articles adjacent the conveyor and in time with the bag fabricating stations to frictionally engage a specific surface portion of each of the sheet articles, and while in engaging contact, partially restraining the sheet article and causing it to leave or move away from the speed attenuating station at a speed which is substantially less than the rate of speed at which it enters the station. This rate at which it leaves is sufficiently low, in the range of 100 feet per minute, for example, to permit free flight of the sheet article in a controllable and reproducible form, that is, the longitudinal rigidity and stability of the article is not lost in moving through the ambient atmosphere onto the stacking area. The speed attenuating means preferably comprises a rotating cylinder which extends transversely across the path of motion of the sheet articles, the cylinder having a radially extending blade mounted along the peripheral surface thereof and the blade having a frictional surface which frictionally engages each of the sheet articles as they move through the attenuating station. In order to prevent the inertial energy of the swiftly moving sheet article from compressing, or otherwise disturbing the longitudinal stability of the article, the speed attenuating means preferably makes contact with or strikes the sheet article only at a trailing edge surface thereof. Therefore, the mass of material which is behind the point of contact of the article with the frictional surface is not sufficiently large so as to cause problems in preserving the longitudinal stability of the sheet article. The speed attenuating apparatus must be in time with and synchronized with the motion in the working or fabricating stations, and also with the conveyor. This synchronization will assist the speed attenuating means in contacting a selected surface portion only of each sheet article as they move therebetween. This synchronization is readily accomplished by any of a variety of means, the technique preferably used including the driving of the speed attenuator, conveyor, and working stations by a single prime mover.

Thus, in moving through a fabrication process, the film is initially converted to a sheet article or device such as a bag or the like in a plurality of working stations. These working stations may include passing a pair of superimposed lengths of film along the apparatus, sometimes utilizing a surface of a plow or the like in order to form longitudinal folds, creases, or the like in the film, and finally to a sealing station. The heat sealing of the thremoplastic material is normally one of the final operations in the sheet article fabrication mechanism. Thus, the raw material is pulled through the forming stations by a pair of draw-rolls, downstream of which is positioned a heated sealing bar or device such as a heated knife blade or the like. The draw-rolls function intermittently by means of a crank motion and may, for example, be driven in a device such as is defined in Patent No. 2,997,889, dated Aug. 29, 1961, G. T. Schjeldahl et al., entitled "Intermittent Engine" and assigned to the same assignee as the present application. During the dwell cycle of the intermtitent motion of the draw-rolls, the heated welding bar, knife, or the like is brought into contact with the layers of thermoplastic film, and a surface-to-surface weld is formed thereon. The material then leaves the sealing station, being picked off by a suitable pick-off device, and enters the constant speed conveyor as individually spaced articles. Upon leaving the conveyor, the articles pass through corrugating rolls, and thereafter are transferred to the speed attenuating station where the speed is decreased and the sheet article permitted to pass downwardly, in a free and controllable manner into a stacking area such as a stacking gate assembly or bin arrangement or the like.

Therefore, it is an object of the present invention to provide an improved speed attenuating means which is adapted to receive incoming sheet articles moving at a certain high rate of speed, reduce this rate of speed to a substantially lower rate, and ultimately discharge the sheet articles without interfering with or reducing the longitudinal stability of the articles as they move against a stacking gate disposed in a stacking area.

It is a further object of the present invention to provide an improved speed attenuating means which is adapted to receive incoming sheet articles moving at a certain high rate of speed, reduce this rate of speed to a substantially lower rate by frictionally engaging a predetermined surface portion of the sheet article, and then discharging the article from the speed attenuating station without interfering with or reducing the longitudinal stabiliy of the sheet articles as they move to a stacking area or gate.

It is still a further object of the present invention to provide an improved speed attenuating means which is adapted to receive incoming sheet articles moving at a certain high rate of speed, and reduce this rate of speed to a substantially lower rate by contacting a surface portion of the article at a point adjacent the trailing edge thereof, and thence discharging the article without interfering wih or reducing the longitudinal stability as it moves against a stacking area or gate.

It is still a further obect of the present invention to provide an improved speed attenuating means which is adapted to receive incoming sheet articles moving at a certain high rate of speed, reduce this rate of speed to a substantially lower rate by contacting a surface area of the article at a point which is adjacent the trailing edge thereof as it moves through the speed attenuating means, the speed attenuating means being adapted to provide a downward thrust on the article as it leaves the speed attenuating station.

Other and further objects of the present invention will become apparent to those skilled in the art upon a study of the following specification, appended claims, and accompanying drawings, wherein:

FIGURE 2 is a detail diagrammatic view of the pick-off mechanism adapted to remove sheet articles from the fabricating station, the constant speed conveyor, and the speed attenuating station at the downstream area thereof, the pick-off mechanism being shown in one stage of its operation;

FIGURE 3 is a diagrammatic view similar to that of FIGURE 2, and showing the pick-off mechanism in a somewhat different stage of operation;

FIGURE 6 is a top view of the apparatus shown in FIGURES 2 and 3; and

FIGURE 7 is a diagrammatic view, on a reduced scale, showing the various processing stages which are employed in sheet article forming devices, and illustrating the physical arrangement of the apparatus of the present invention in combination with this forming apparatus.

Figure 1:
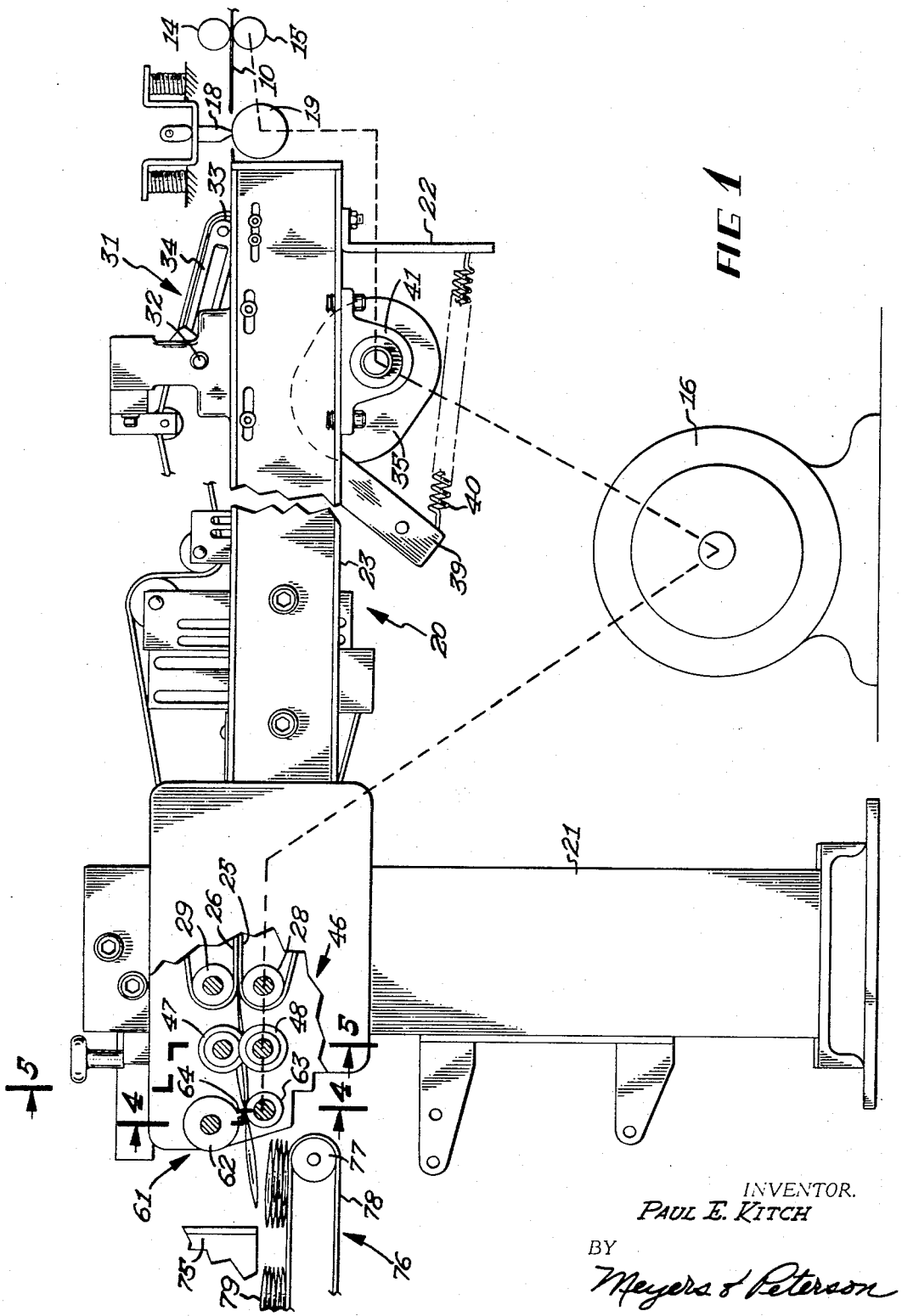
FIGURE 1 is a side elevational view, partially broken away and partially in section, and showing a speed attenuator station being provided at the terminal end of the conveyor, this view also showing a portion of the sheet article fabricating mechanism.

In accordance with the preferred modification of the present invention, the sheet article forming and treating means shown in FIGURE 1 is treating a pair of continuous films or webs of polyethylene or similar sheet material 10 which are being drawn from a pair of supply rolls, as shown in FIGURE 7, as at 11 and 12, by means of a pair of mating and cooperating draw-rolls 14 and 15. The draw-rolls are powered by the main power source 16, and driven intermittently in accordance with the apparatus disclosed and claimed in the aforementioned patent of G. T. Schjeldahl et al. The sheet article forming apparatus, which in this instance if forming flat bags from a continuous stock of polyethylene material, includes a heated knife or welding bar 18 which has a blunt surface and which is adapted to make intermittent contact with or be driven toward the bar roll 19. The heated knife or welding bar 18 is driven by a cam mechanism as illustrated in FIGURE 2, the bar 18 being adapted for intermittently contacting the film while being driven in a reciprocal up-and-down motion. The sheet material 10 moves during the time that the heated knife or welding bar 18 is raised from the roll 19, and is stationary or at dwell when the bar 18 is in contact with the roll 19. The bar 18, together with the roll 19, provides a welded seam or the like along the edges of a bag body. This bag fabrication operation is one which may be accomplished by a number of bag machines which are commercially available such as, for example, that bag making machine sold by the G. T. Schjeldahl Company of Northfield, Minn., under their Code Number 208. The conveyor mechanism is shown generally at 20 and includes support legs 21 and 22 along with a horizontal frame or bed 23. The conveyor includes a lower run such as at 25 (most clearly shown in FIGURES 2 and 3) and an upper run 26. These conveyor runs may, for convenience, comprise a plurality of parallely disposed bands of flexible webbing or the like. Conveyors of this type are, of course, commercially available and are adapted to move the sheet articles therealong at a rate of in excess of 100 feet per minute and in the present apparatus up to 200 feet per minute. The individual runs of webbing are driven, as required, by the drive rolls 28 and 29, these drive rolls, of course, preferably being controlled by the same prime mover such as the motor 16 as are the remaining components of the system. In order to bring the individual bags into the constant speed conveyor system 20, a pick-off mechanism generally shown at 31 is utilized. This pick-off mechanism includes an arcuately reciprocating jaw or the like which is pivoted about the rod member 32, the jaw comprising a portion of the upper conveyor run 26, such as the end terminal roll 33. The jaw mechanism 31 is adapted to pivot upwardly about the axially pivotal rod 32, such as is illustrated in the two dispositions of this pick-off mechanism shown in FIGURES 2 and 3. A rotating cam such as the cam member 35, driven by the motor 16, rotates about shaft 36 and has a cammed surface including an ear or lobe as at 37. The cam follower surface is shown at 38, and a spring tension member 39 is utilized to hold the cam follower 38 against the surface of the cam 35. The shaft 36 is suitable journaled in the bearing members shown at 41. The pick-off mechanism 31 is obviously timed in synchronism with the heated knife or welding bar 18.

Briefly, in operation, as the bar 18 comes into a dwell position adjacent the surface of the thermoplastic strip or web 10, a short dwell cycle is permitted in order to enable the bond to be formed between the layers of thermoplastic material. After this interval of time, the upper conveyor run 26 is brought into contact with the lower conveyor run 25, and in this manner frictionally removes the completed bag from the roll. Since the weld will fracture along its central axis at this point, a thin weld seam is available at the material which remains between the knife 18 and the bar roll 19. Upon lifting of the bar 18 and thereafter, in sequence, with an additional arcuate rotation of the draw-rolls 14 and 15 to bring material beyond the sealing zone, the system is ready for a new cycle. Preferably the arm 34 which carries the roller 33 is longitudinally adjustable relative to the rotating shaft 32 in order to properly longitudinally position and tension the jaw 31 relative to the bar 18. Since the conveyor 20 operates at a constant speed with the individual bags being formed intermittently, the speed at which the conveyor runs will exceed the speed at which the draw-rolls bring the material into position for the bar 18. Therefore, the individual bags such as are shown at 42, 43, etc., represent respectively a bag which has been removed from the fabricating mechanism and one which is entering the pick-up area.

The bar 39, which is secured in locking engagement with the rod 32 and is pivotal thereabout, carries the cam follower 38 and is also coupled to the spring member 40.

As the individual bags leave the conveyor mechanism 20, the leading edge of each bag, such as the bag 45, moves into interengaging relationship with the corrugating wheels generally designated 46. The corrugating wheels 46 include a plurality of vertically and axially off-set rotating wheels, such as the wheels 47 and 48; for reasons of clarity, each of the upper corrugating wheels has been identified by the numeral 47, while the lower rolls are identified by the numeral 48. Upon leaving the constant speed conveyor, it is necessary to prepare the individual sheet articles for entering the stacking area. Thus, the axially off-set, interleaved corrugating wheels 47—47 and 48—48 provide a longitudinally directed corrugated effect in the individual sheet articles. This provides additional longitudinal stability and a certain amount of longitudinal rigidity in order to accommodate the bag in its travel to the stacking area or gate. This configuration is shown in FIGURE 5 of the drawings.

Figure 5:
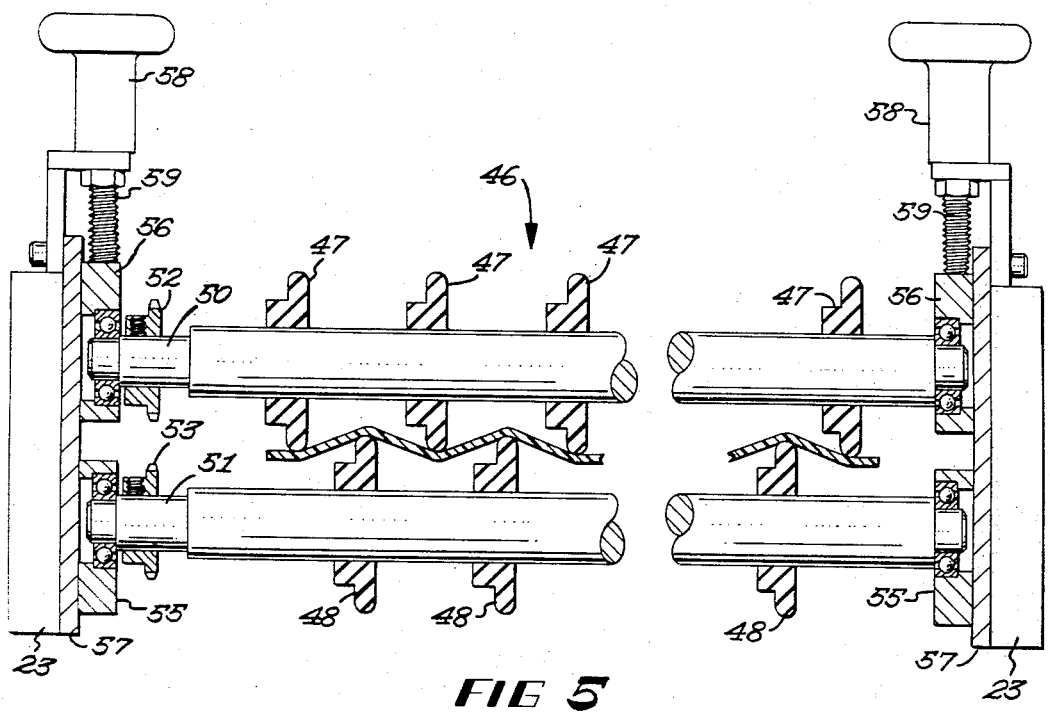
FIGURE 5 is a vertical detail sectional view taken along the line and in the direction of the arrows 5—5 of FIGURE 1 and showing the corrugating wheels utilized in connection with the apparatus of the present invention.

With particular attention now being directed to FIGURE 5, it will be seen that the corrugating wheels are mounted upon the rotatable shafts 50 and 51, these shafts being driven by the sprocket members 52 and 53 respectively. In this regard, an endless chain, coupled through the power source, is adapted to extend across the individual sprocket members 52 and 53 and thereby span the two sprockets. In order to control the depth to which the circumferences of the individual corrugating wheels 47—47 and 48—48 interengage, these wheels are journaled for rotation in the blocks 55—55 and 56—56, these blocks being suitable bearings, as shown. The blocks 56—56 are movably mounted against the backing plates 57—57, and the handles 58—58 may be utilized through their threaded extensions 59—59 to control the relative disposition of the upper blocks 56—56. The backing plate 57 is, of course, secured to the longitudinal frame elements 23—23 by suitable means.

Figure 4:
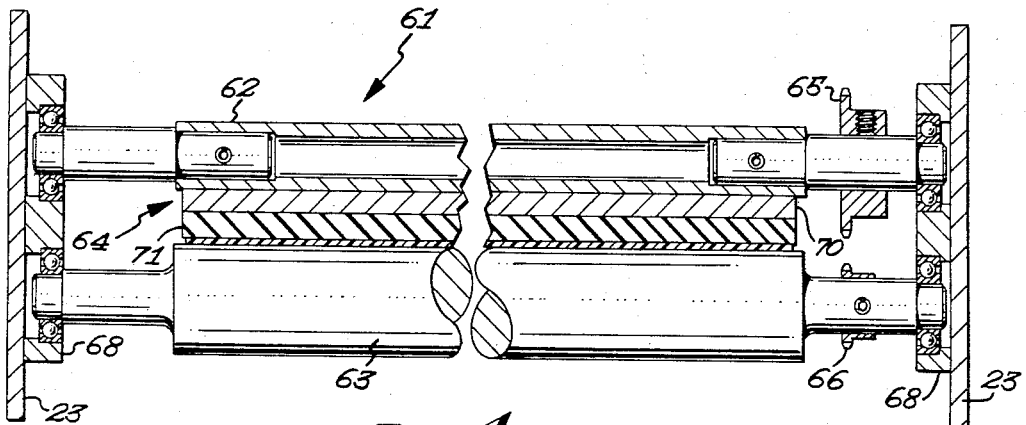
FIGURE 4 is a vertical sectional view taken along the line and in the direction of the arrows 4—4 of FIGURE 1, this view showing the detail of the sheet article speed attenuating mechanism.

After the individual sheet articles leave the corrugating wheels, they pass, without an intermediate conveyor, to the speed attenuating station shown generally at 61. With particular attention being directed to FIGURE 4 of the drawings, it will be seen that the speed attenuating apparatus includes an upper roller 62 and a lower roller 63, these rollers being off-set vertically, one from another, the upper roller 62 being provided with a frictional surface engaging radially extending member 64. The rollers 62 and 63 are driven at equal rates of peripheral speed by means of the sprockets 65 and 66, each of which obtain their energy of rotation from the prime mover or motor 16. The individual rollers 62 and 63 are journaled for rotation in the end block members 68—68, the rollers being suitably supported by ball bearings or the like. The clearance existing between the surfaces of the roll 63 and the edge surface of the radial extension 64 is controlled and minimal, thus assuring the physical contact of the frictional surface of the projection 64 with the sheet article. Specifically, the radial extension or projection includes a blade retaining mandrel 70 and a resilient member, such as sponge rubber of the like, 71 which extends radially in the form of a blade from the blade retaining mandrel 70. If desired, for purposes of replacing the projection on the roll 62, it is seen that the unit may be disassembled in order that different width blades 64 may be employed. It is essential that the blade 65 be synchronized in time with the heated knife or welding bar 18, the pick-off mechanism 31, and the conveyor drives 28 and 29.

The blade 71 is adapted to make physical contact with the surface of the sheet article or bag as it moves in the area defined between the rolls 62 and 63 at a point adjacent the trailing edge of the article. Thus, the force which is exerted on or along the individual sheet articles as they pass between the rolls 62 and 63 due to the decelleration or change in velocity is in the form of a tensile force, and not in the form of a compressive force. Thus, the individual sheet articles are not disturbed along their longitudinal extent, and the deceleration occurs without disturbing the longitudinal stability of the individual sheet articles leaving the decelerating station.

It will be observed that the individual axis for the rolls 62 and 63 are off-set in vertical relationship. It will be further observed that the upper roll 62 is disposed downstream from the lower roll 63, thus the blade 64 comes into contact with a sheet article moving therethrough, the trailing edge of the individual article will be forced downwardly by the specific disposition of the blade 64. Thus, as the individual sheet articles leave the decelerating station, they are forced downwardly at the trailing edge until the blade 64 reaches a bottom-dead-center position, and thus assist in their controlled drop or flight to the stacking area or gate.

The stacking area or gate includes a plate member 75 which is interposed along the path of the conveyor and is disposed above a slowly moving conveyor generally designated 76. The conveyor 76 is preferably an intermittently driven conveyor, driven by the roll 77 and comprising an endless belt 78. This unit has a much slower rate of travel than the constant speed conveyor 20. The individual sheet articles are stacked in superimposed relationship in predetermined numbers per stack on the upper run of the endless belt 78 such as is shown at 79. Thus, after leaving the decelerating or speed attenuating station 61, the sheet articles fall freely onto the upper run of the conveyor mechanism 76. It will be seen that the rate of speed at which the entire system can be operated is increased when the sheet articles may be delivered from the pick-off conveyor at a safe rate. Thus, with the conveyor 20 operating at a relatively high rate of speed, the individual sheet articles are carefully and slowly delivered from the end of the run against a stacking and onto a slow moving conveyor where they may be ultimately delivered to a working or counting station.

It will be appreciated that the system shown and described herein may constitute a plurality of parallely disposed identical runs, the apparatus shown in FIGURE 7 illustrating a system including a plurality of parallel runs. As indicated, the system, as shown for purposes of explanation, includes a first guide roll 80 together with an intermittently actuated longitudinal sealing mechanism generally designated 81 which makes intermittent contact with the films passing along the conveyor and provides a plurality of parallely disposed longitudinal seals along the length of the polyethylene film. Downstream from the longitudinal sealing station a rotating cutter or knife roll 82 is provided to sever the longitudinally sealed film into parallely disposed webs, each web preferably having a seal along one edge surface thereof. As previously indicated, edge seals are provided and bags are severed along the individual webs at the sealing bar 18.

It will, of course, be understood that various changes may be made in the form, details, arrangements and proportions of the parts without departing from the scope of the invention as set forth in the appended claims.

What is claimed:

1. In combination with means for conveying discrete sheet film bags along a predetermined path at a first relatively high rate of speed; a fabricating station for delivering finished bags onto said conveyor at predetermined spaced intervals therealong; and speed attenuating means for decelerating said bags to a substantially lower rate of speed as they leave said conveyor path at the terminal delivery zone thereof, said speed attenuating means comprising:
    (a) a cylindrical drum mounted for axial rotation and extending transversely of said path,
    (b) means for rotating said drum, said means rotating said drum being in synchronism with said fabricating station, said drum having blade means extending substantially the length of said drum adapted to engage each of said bags at a predetermined point along the surface and adjacent to the rear edge thereof for substantially retarding said bag, and
    (c) a roller guide and support surface disposed transversely immediately below and across said path and having an axis of rotation located slightly forwardly but within the radius of the drum,
    (d) said blade means including a radially disposed blade having a frictional surface and being mounted along the peripheral surface of said drum, said radially disposed blade being generally at a bottom dead center disposition at a point which is downstream along said conveyor from said guide and support surface thus the blade means will force downwardly the rear edge of said bag to thereby assist the flight of the bag to the stacking area.

2. The apparatus as claimed in claim 1 being particularly characterized in that a stacking gate is disposed at the terminal end of said path with said cylindrical drum and said guide surface being positioned between said stacking gate and said conveyor.

3. The apparatus as defined in claim 1 being particularly characterized in that said frictional surface is a resilient frictional surface.

4. The apparatus as defined in claim 1 being particularly characterized in that said cylindrical drum rotates one revolution for each discrete sheet article prepared in said fabrication station.

References Cited

UNITED STATES PATENTS

| | | | |
|---|---|---|---|
| 1,118,357 | 11/1914 | King | 271—46 |
| 3,034,780 | 5/1962 | Stelling, et al. | 271—46 |
| 3,124,059 | 3/1964 | Labombarde | 214—6 |
| 3,124,352 | 3/1964 | Weldenhammer | 198—167 |
| 3,228,273 | 1/1966 | Huffman | 271—46 |

ROBERT G. SHERIDAN, *Primary Examiner.*

GERALD M. FORLENZA, *Examiner.*

J. E. OLDS, *Assistant Examiner.*